United States Patent
Dorsch et al.

(10) Patent No.: US 8,584,812 B2
(45) Date of Patent: Nov. 19, 2013

(54) ELEVATOR BRAKE RELEASE MONITOR

(75) Inventors: Andreas Dorsch, Lucerne (CH); Philippe Henneau, Zurich (CH)

(73) Assignee: Inventio AG, Hergiswil (CH)

( * ) Notice: Subject to any disclaimer, the term of this patent is extended or adjusted under 35 U.S.C. 154(b) by 394 days.

(21) Appl. No.: 13/057,398

(22) PCT Filed: Aug. 3, 2009

(86) PCT No.: PCT/EP2009/060028
§ 371 (c)(1),
(2), (4) Date: Feb. 3, 2011

(87) PCT Pub. No.: WO2010/020533
PCT Pub. Date: Feb. 25, 2010

(65) Prior Publication Data
US 2011/0132696 A1   Jun. 9, 2011

(30) Foreign Application Priority Data
Aug. 18, 2008  (EP) ..................... 08162550

(51) Int. Cl.
*B66B 1/34* (2006.01)
(52) U.S. Cl.
USPC ........................................ 187/393; 187/287
(58) Field of Classification Search
USPC ......... 187/247, 248, 277, 284, 288, 289, 291, 187/305, 313, 314, 316, 317, 391, 393, 286, 187/287; 702/179, 182–185
See application file for complete search history.

(56) References Cited

U.S. PATENT DOCUMENTS

| | | | | |
|---|---|---|---|---|
| 3,961,688 A * | 6/1976 | Maynard | ........................ | 187/289 |
| 4,923,055 A * | 5/1990 | Holland | ........................ | 187/287 |
| 4,982,815 A * | 1/1991 | Arabori et al. | ................ | 187/288 |
| 7,350,883 B2 * | 4/2008 | Hubbard et al. | ............. | 303/191 |
| 7,353,916 B2 * | 4/2008 | Angst | ........................... | 187/393 |
| 7,669,697 B2 * | 3/2010 | Ueda et al. | .................... | 187/391 |
| 7,775,330 B2 * | 8/2010 | Kattainen et al. | ............ | 187/393 |
| 7,896,136 B2 * | 3/2011 | Shibata et al. | ................ | 187/288 |
| 7,918,320 B2 * | 4/2011 | Kondo et al. | ................. | 187/288 |
| 8,272,482 B2 * | 9/2012 | Takahashi et al. | ............ | 187/393 |
| 8,297,413 B2 * | 10/2012 | Kigawa et al. | ................ | 187/393 |
| 8,365,873 B2 * | 2/2013 | Viita-Aho et al. | ............ | 187/393 |
| 2009/0178889 A1 * | 7/2009 | Harkonen et al. | ............ | 187/373 |

FOREIGN PATENT DOCUMENTS

DE   29921230 U1   2/2000
EP   0502282 A1   9/1992

* cited by examiner

*Primary Examiner* — Anthony Salata
(74) *Attorney, Agent, or Firm* — Fraser Clemens Martin & Miller LLC; William J. Clemens

(57) ABSTRACT

A brake monitor for monitoring a brake system of an elevator system that includes a drive and a drive controller checks for a travel signal generated by the elevator system. If a brake-release signal is not received within a time-window after the occurrence of the travel signal, the brake monitor activates a relay circuit for interrupting a safety circuit of the elevator system or for interrupting a control voltage of the drive controller so that the elevator system can be stopped.

16 Claims, 7 Drawing Sheets

US 8,584,812 B2

ELEVATOR BRAKE RELEASE MONITOR

FIELD OF THE INVENTION

The invention relates to a method for operating a brake monitor in an elevator system and a corresponding brake monitor. The invention also relates to a method for retrofitting, or modernizing, an existing elevator system with such a brake monitor.

BACKGROUND OF THE INVENTION

Elevator systems of conventional type generally have a drive, a drive control that is assigned to the drive, and a brake system. Gradually, existing elevator systems are being modernized, to improve their energy efficiency, increase their safety, and fulfill the latest conditions for authorization of operation.

In the case of modernization, particularly the safety aspect is given great emphasis, and often the drive machine and/or the drive control are replaced. As a new drive control it is usual to employ a VVVF (variable voltage, variable frequency) control or an ACVF (alternating current, variable frequency) control. As a new drive machine, a Schindler SGB 142 drive machine can be advantageously employed. In this Schindler SGB 142 drive machine, the holding brake fulfills the stipulations of the safety regulations, and an additional rope brake or safety gear is no longer required. The condition, however, is that the holding brake of the newly installed drive machine is correspondingly monitored.

Also in the case of new elevator systems, there is a need for better monitoring of the brake systems.

If the holding brakes do not release correctly when the drive machine starts, they can become worn. Moreover, unreleased brakes can generate smoke, which under certain circumstances can cause a hazard to the passengers. The generation of smoke can arise because the drive machine often develops sufficient drive torque to assure travel operations also with unreleased brakes.

An exemplary device for monitoring an elevator control is to be found in patent specification EP 903 314 B1.

The task therefore presents itself of proposing a corresponding monitoring solution for elevator systems, e.g. for modernized elevator systems with a newly installed drive machine, which allows monitoring of the holding brake.

Since, however, existing elevator systems can also be modernized in that the holding brake is monitored by a drive machine that is present, it is also to be considered as a task of the present invention to develop a monitoring solution for such situations. The monitoring solution that is sought should generally be usable also for new elevator systems.

Preferably, the monitoring solution should therefore be universally usable and flexibly designed, so as to be able to employ one and the same monitoring solution in the most diverse elevator systems. Preferably, the monitoring solution should be so designed that, with only a few manual adjustments and/or reprogrammings, an adaptation to the respectively prevailing situation can be undertaken.

SUMMARY OF THE INVENTION

According to the invention, a method is proposed which is characterized by the following steps. A first brake-release signal of the brake system, and a first travel signal of the drive control, are received. A check is then made as to whether, after occurrence of the first travel signal, a first brake-release signal is present, this brake-release signal appearing when a brake of the brake system has been released. If this brake-release signal does not appear within a time-window, a relay circuit for interrupting a safety circuit of the elevator system is activated, or a control voltage of the drive control is interrupted, to bring the elevator system to a standstill.

According to the invention, a brake monitor is provided which has a first brake-signal input for the purpose of connecting the brake monitor with a first electrical brake contact of the brake system. Further provided is a travel-signal input, for the purpose of connecting the brake monitor to a first electrical travel-signal conductor of the drive control. The brake monitor comprises a voltage source to provide the brake monitor with at least an operating voltage, a microprocessor, and a relay circuit. The relay circuit is designed in such manner that the relay circuit can be activated by the microprocessor, so that through the activation of the relay circuit a safety circuit of the elevator system, or a control voltage of the drive control, is interrupted, and thereby the elevator system is brought to a standstill, either immediately or after a deceleration phase.

In a preferred embodiment, the brake monitor according to the invention is so designed that it can be employed in direct-current, as well as alternating-current, elevator systems.

DESCRIPTION OF THE DRAWINGS

The invention is described in detail below in relation to exemplary embodiments and by reference to the figures. Shown are in.

DESCRIPTION OF PREFERRED EMBODIMENTS

Figure 1:
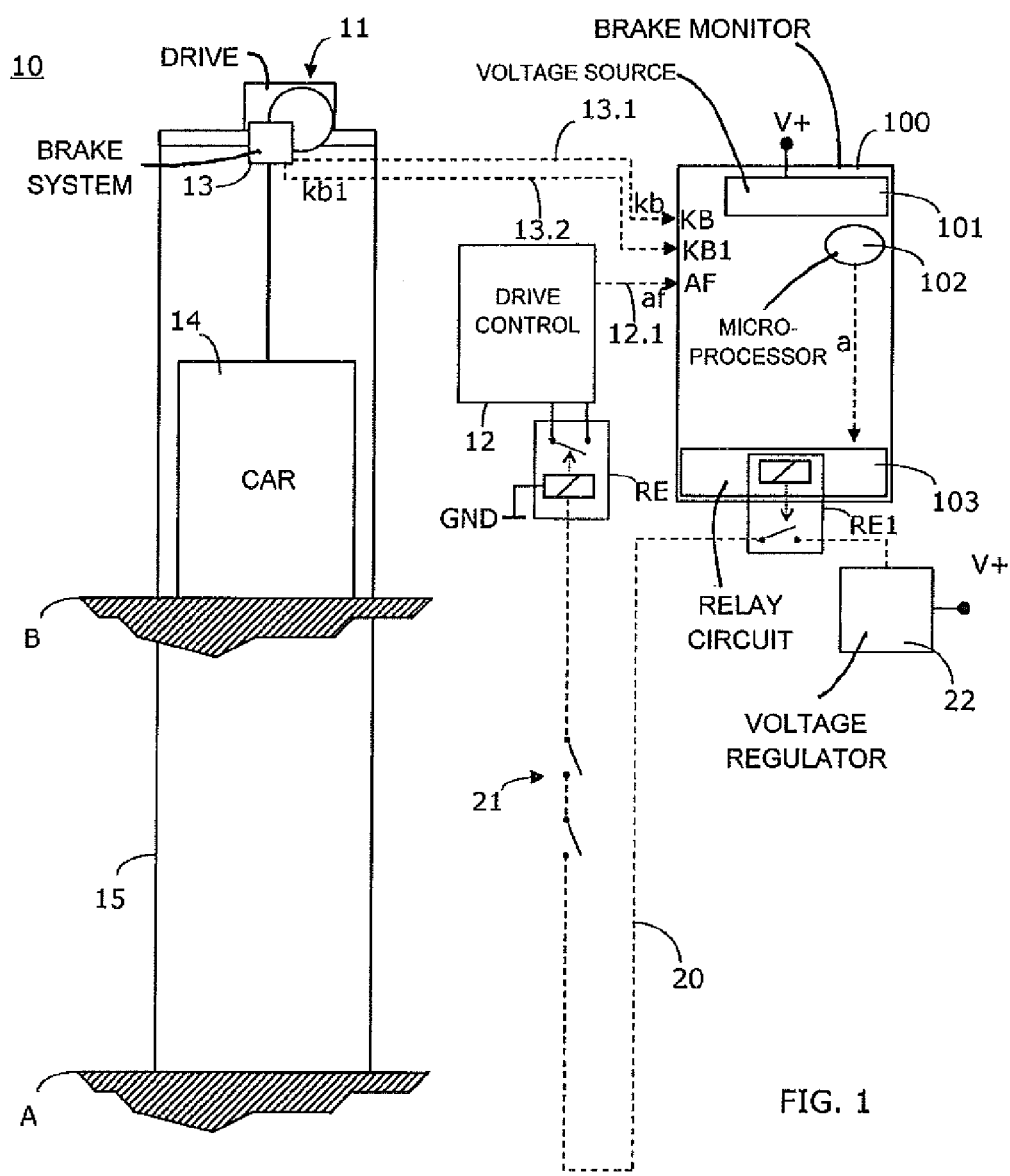
FIG. 1 an elevator system with a first brake monitor according to the invention, in a greatly simplified diagrammatical representation.

FIG. 1 shows a first embodiment of the invention. Shown in highly diagrammatical form is an elevator system 10. The elevator system 10 contains an elevator car 14, which is guided in vertically movable manner in an elevator hoistway 15. The elevator car 14 can serve a plurality of floors (shown here are two floors, A and B). The elevator car 14 can be moved by a drive 11, which, for example, as indicated in FIG. 1, is located at the upper end of the hoistway. In addition to the drive 11, the elevator system 10 has a drive control 12 and a brake system 13, which are assigned to the drive 11. The connection between the drive control 12 and the elements of the elevator system 10 are not shown. Typically, however, the drive control 12 receives signals. These signals are transformed into control parameters. When the drive 11 sets the elevator car 14 in motion, the brake system 13 releases the (holding) brake(s). On reaching a destination floor (e.g. in FIG. 1, floor B), the speed of the drive 11 is reduced, and the (holding) brake(s) of the brake system 13 enter into action, to halt the elevator car 14 at the correct height and hold it there.

Since existing elevator systems frequently do not offer a corresponding monitoring solution that could be employed to monitor the functioning of the (holding) brake(s), a brake monitor 100 according to the invention is employed, which has a first brake-signal input KB, to allow connection via a brake-signal conductor 13.1 of the brake monitor 100 to a first electrical brake contact K1 (not shown) of the brake system 13. Furthermore, the brake monitor 100 has a travel-signal input AF to allow connection via a travel-signal conductor 12.1 of the brake monitor 100 to a first electrical travel-signal contact of the drive control 12.

To provide the brake monitor 100 with at least an operating voltage VCC (cf. FIG. 4), a voltage source 101 is present. The voltage source 101 is connected to at least one voltage source (e.g. V+ in FIG. 1) of the elevator system 10 and provided with the corresponding voltage of the source. The brake monitor 100 further contains a microprocessor 102, and a relay circuit 103. This relay circuit 103 is so designed that, through the microprocessor 102, the relay circuit can be activated, so as to interrupt a safety circuit 20 of the elevator system 10, or a control voltage of the drive control 12, by activating the relay circuit 103. The safety circuit 20, which is, for example, passed through the elevator car 14 and the elevator hoistway 15, has a plurality of contacts 21, for example on the hoistway doors. Shown in FIG. 1 is a possible embodiment of a safety circuit 20. The safety circuit 20 contains a voltage regulator 22, and is connected to at least one voltage source (V+ in FIG. 1) of the elevator system 10, and fed by the latter. Provided that all of the contacts 21, and the relay RE1, are closed, a voltage that is provided by the voltage regulator 22 is present on the safety relay RE. If the safety circuit is interrupted by a fault in the elevator system (e.g. by a fault of the brake system 13, which has been detected by the brake monitor 100), the relay RE switches and, via the elevator control 12, brings the elevator system to a standstill.

It should be noted here that there are various other types of configuration and connection of the safety circuit. The connection largely depends on whether relays are employed that are normally open or normally closed.

Figure 2:
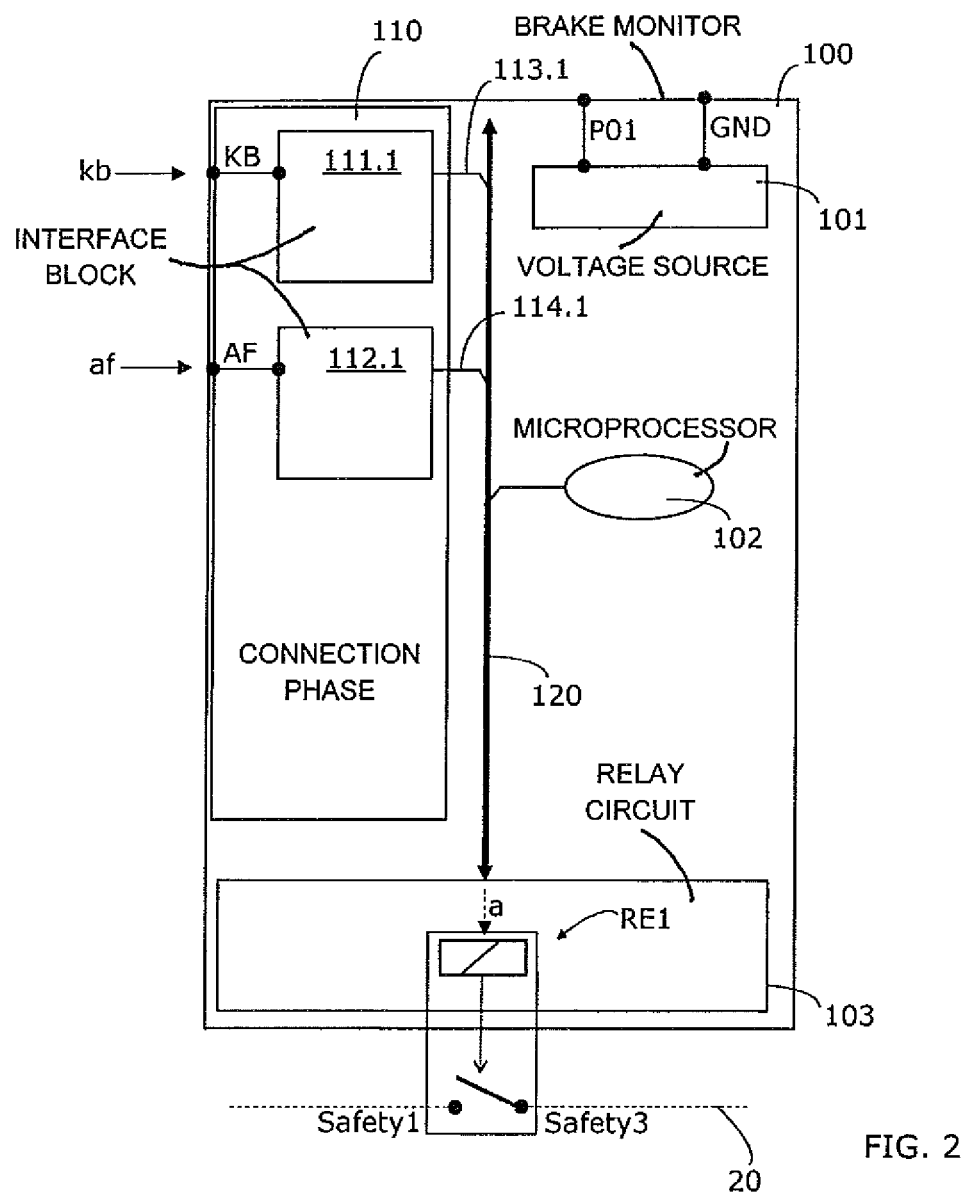
FIG. 2 details of a second brake monitor according to the invention, in a greatly simplified diagrammatic representation.
Figure 3:
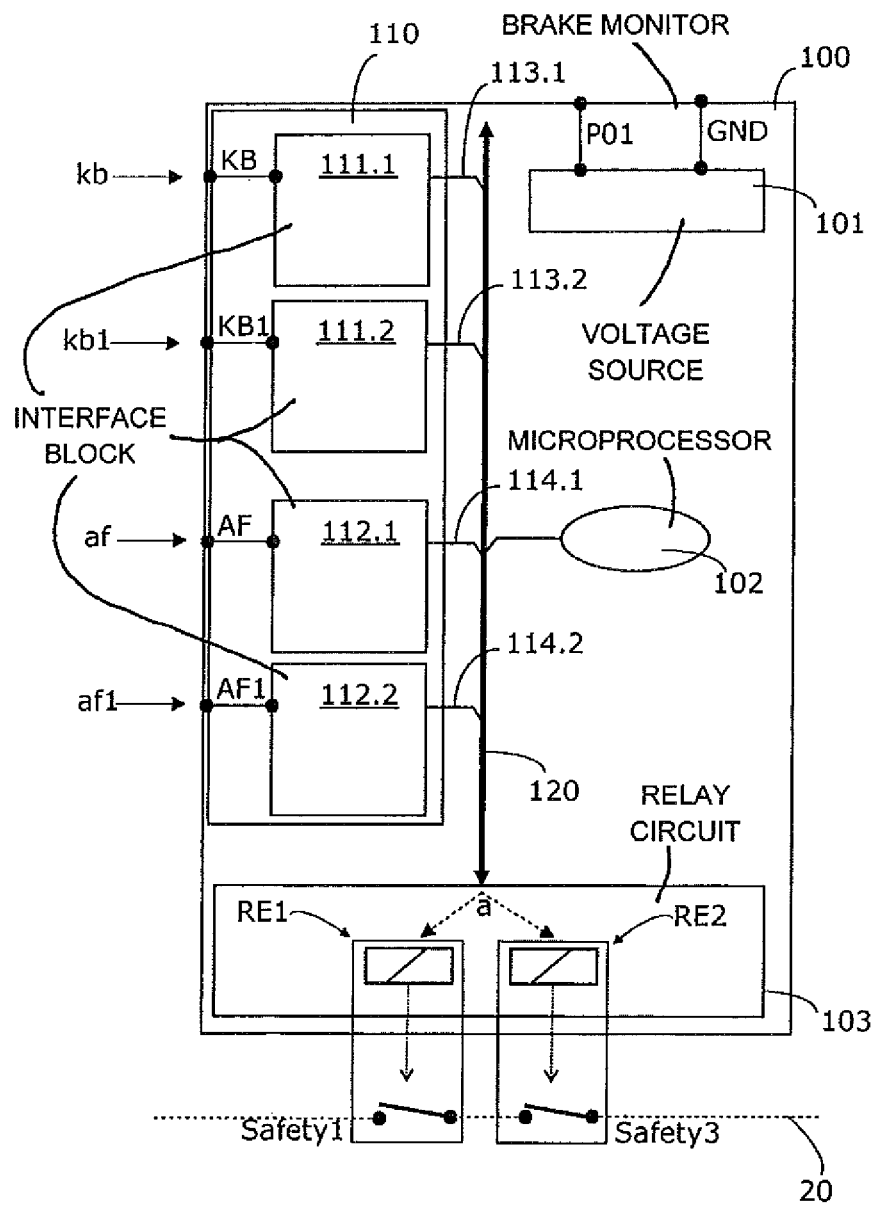
FIG. 3 details of a third brake monitor according to the invention, in a greatly simplified diagrammatic representation.
Figure 6:
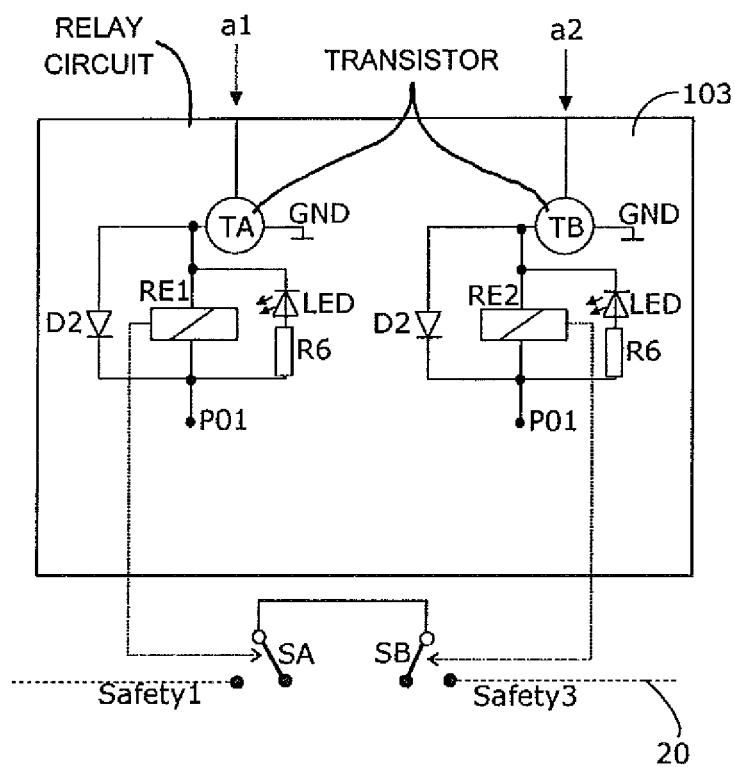
FIG. 6 details of a relay circuit according to the invention, which can be part of a brake monitor.

The safety circuit 20 is depicted purely graphically also in FIGS. 2, 3 and 6.

The activation of the relay circuit 103 by the microprocessor 102 is indicated in FIG. 1 by the signal a and a dotted arrow. Should the brake monitor 100 detect problems, through activation of the relay circuit 103, the elevator system 10 can be safely and reliably brought to a standstill.

In an exemplary embodiment, the brake monitor 100 takes the form of a separate circuit or subassembly, which can be subsequently, or additionally, mounted/installed. The circuit or subassembly is provided with fastening means, and has electrical contacts and/or plug-connectors to allow connection to the (brake and/or travel) contacts of the brake system 13 and the drive control 12.

Shown in FIG. 2 are details of a second brake monitor 100. Shown is a block diagram of the salient circuit elements. On the input side, the brake monitor 100 has a connection phase 110. This connection phase 110 has two or more interface blocks 111.1, 112.1. The interface block 111.1 receives from the first brake-signal input KB a brake-release signal kb. Preferably by means of a voltage-adjustment circuit, which is part of the interface block 111.1, this brake-release signal kb is transformed into the supply voltage (e.g. 5 V) of the brake monitor 100. The interface block 111.1 can also contain an optional diode circuit to filter voltage peaks out of the brake-release signal kb. The interface block 111.1 can also contain an optional optocoupler circuit to provide galvanic isolation between the first brake-signal input KB and the output side 113.1 of the interface block 111.1.

The interface block 112.1 receives from the first travel-signal input AF a travel signal af. By means of a voltage-adjustment circuit, which is part of the interface block 112.1, this travel signal of is preferably transformed into the supply voltage (e.g. 5 V) of the brake monitor 100. The interface block 112.1 can also contain an optional rectifier (as shown, for example, in FIG. 5), to transform an alternating-voltage travel signal of into a direct-voltage signal. The interface block 112.1 can also contain an optional optocoupler circuit to provide galvanic isolation between the first travel-signal input AF and the output side 114.1 of the interface block 112.1.

The output sides 113.1, 114.1 of the interface blocks 111.1, 112.1 are preferably connected to an (input/output) bus system 120 of the brake monitor 100.

The brake monitor 100 further contains a relay circuit 103, which is so designed that, through the microprocessor 102, the relay circuit (via a control signal a, which can be transmitted over the bus system 120) can be activated, so as to, through the activation of the relay circuit 103, interrupt the safety circuit 20 of the elevator system 10, or a control voltage of the drive control 12, so as to thereby immediately, or after a delay, bring the elevator system 10 to a standstill. For this purpose, the relay circuit 103 contains at least one relay RE1, which can be switched by means of the control signal a. Preferably, on its output side, the relay RE1 is integrated in the safety circuit 20 of the elevator system 10, or connected to a control-voltage conductor, in such manner that the safety circuit 20 is closed (i.e. the elevator system 10 is functioning), only when the microprocessor 102 detects no faults (i.e. when no control signal a is present) and when all other components of the brake monitor 100 are functioning faultlessly. On occurrence of a fault in the brake monitor 100, or should the microprocessor 102 detect a fault in the brake system 13, the relay RE1 opens automatically and the travel operation of the elevator system 10 is interrupted. In FIG. 2, the relay RE1 is shown in the opened state, and the safety circuit 20 is interrupted by the brake monitor 100.

Particularly preferred is an embodiment in which, in the relay circuit 103, two relays are employed which are connected in series. By this means, the redundancy, and hence also the safety, are increased. Particularly preferred are so-called safety relays. For each relay, the relay circuit 103 preferably contains a switching transistor for the purpose of transforming the control signal a (preferably a signal in the range of the 5 V supply voltage), which is transmitted over the bus system 120, into a switching signal (preferably a signal in the range of the 24 V supply voltage) for the relays.

Shown in FIG. 3 are details of a third brake monitor 100. Shown is a block diagram of the salient circuit elements. On the input side, the brake monitor 100 has a connection phase 110. This connection phase 110 has four or more interface blocks 111.1, 111.2, 112.1, 112.2. The interface block 111.1 receives from the first brake-signal input KB a brake-release signal kb. Preferably by means of a voltage-adjustment circuit, which is part of the interface block 111.1, this brake-release signal kb is preferably transformed into the supply voltage (e.g. 5 V) of the brake monitor 100. The interface block 111.1 can also contain an optional diode circuit, to filter voltage peaks out of the brake-release signal kb. The interface block 111.1 can also contain an optional optocoupler circuit to provide galvanic isolation between the first brake-signal input KB and the output side 113.1 of the interface block 111.1.

The interface block 111.2 is preferably constructed identical to the interface block 111.1 and receives from the second brake-signal input KB1 a second brake-release signal kb1.

The interface block 112.1 receives from the first travel-signal input AF a travel signal af. Preferably by means of a voltage-adjustment circuit, which is part of the interface block 112.1, this travel signal af is transformed into the supply voltage (e.g. 5 V) of the brake monitor 100. The interface block 112.1 can also contain an optional rectifier to transform an alternating-voltage travel-signal af into a direct-voltage signal. The interface block 112.1 can also contain an optional optocoupler circuit to provide galvanic isolation between the first travel-signal input AF and the output side 114.1 of the interface block 112.1.

The interface block 112.2 is preferably constructed identical to the interface block 112.1 and receives from the second travel-signal input AF1 a second travel signal af1.

The output sides 113.1, 113.2, 114.1, 114.2 of the interface blocks 111.1, 111.2, 112.1, 112.2 are preferably connected to an (input/output) bus system 120 of the brake monitor 100.

The brake monitor 100 further contains a relay circuit 103, which is so designed that the relay circuit can be activated through the microprocessor 102 (via a control signal a, which can be transmitted over the bus system 120), and, through activation of the relay circuit 103, the safety circuit 20 of the elevator system 10, or a control voltage of the drive control 12, is interrupted, and the elevator system 10 thereby brought to a standstill, either immediately or after a delay. For this purpose, the relay circuit 103 contains preferably two relays RE1, RE2, which, for example, can be switched by a common control signal a, or by two separate signals (a1 and a2 in FIG. 6). Preferably, on their output sides, the relays RE1, RE2 are integrated in the safety circuit 20 of the elevator system 10, or connected to a control-voltage conductor, in such manner that the safety circuit 20 is only closed (i.e. the elevator system 10 only functions), when the microprocessor 102 detects no faults (i.e. when no control signal a is present, or when no control signals a1 and a2 are present), and when all other components of the brake monitor 100 are functioning faultlessly. In FIG. 3, the switches of both relays RE1 and RE2 are shown closed. This is the normal state of the elevator system, and the elevator car 14 can be moved. On occurrence of a fault in the brake monitor 100, or should the microprocessor 102 detect a fault in the brake system 13, both of the relays RE1, RE2 open automatically, and the travel operation of the elevator system 10 is interrupted.

Particularly preferred is an embodiment in which, in the relay circuit 103, two relays RE1, RE2 are employed, whose switches are connected in series. By this means, the redundancy, and hence also the safety, are increased. Particularly preferred are so-called safety relays. For each relay, the relay circuit 103 preferably contains a switching transistor for the purpose of transforming the control signal a (preferably a signal in the range of the 5 V supply voltage), which is transmitted over the bus system 120, into a switching signal (preferably a signal in the range of the 24 V supply voltage) for the relays RE1, RE2.

Figure 4:
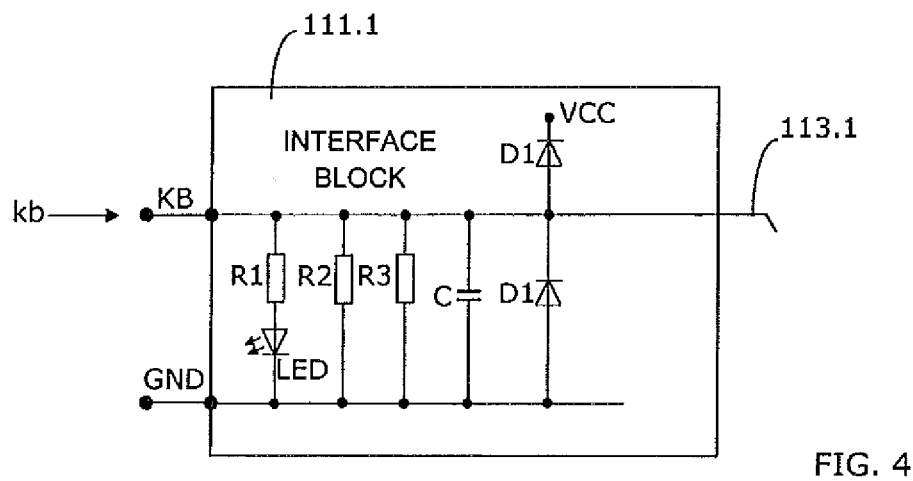
FIG. 4 details of an interface block according to the invention, which can be part of a brake monitor.

Shown in FIG. 4 are details of a first possible interface block 111.1 which can, for example, be employed in one of the brake monitors 100 according to the invention. Shown is a block diagram of the salient circuit elements. Provided on the input side is an optional light-emitting diode (LED) with a series resistor R1. When a brake-release signal kb is present, the light-emitting diode (LED) emits light. Provided is a voltage-adjustment circuit, comprising a plurality of resistors R2, R3, which transforms the supply voltage (e.g. 24 V) on the contacts of the brake system 13 that is to be monitored (or a brake arm of the brake system 13 respectively) into the supply voltage (e.g. 5 V) of the brake monitor 100. The voltage-adaptation circuit is preferably so designed that, for example, through the setting of bridges, or the re-switching of DIP switches (where DIP stands for "dual in-line package"), a voltage adaptation can be effected so that elevator personnel can perform the necessary adaptations themselves on site. DIP switches are small switches which are typically built into so-called DIL housings (where OIL stands for "dual in-line").

The interface block 111.1 can also contain an optional diode circuit with the diodes D1, as shown in FIG. 4, to filter voltage peaks out of the brake-release signal kb. The interface block 111.2 can be identically constructed.

Figure 5:
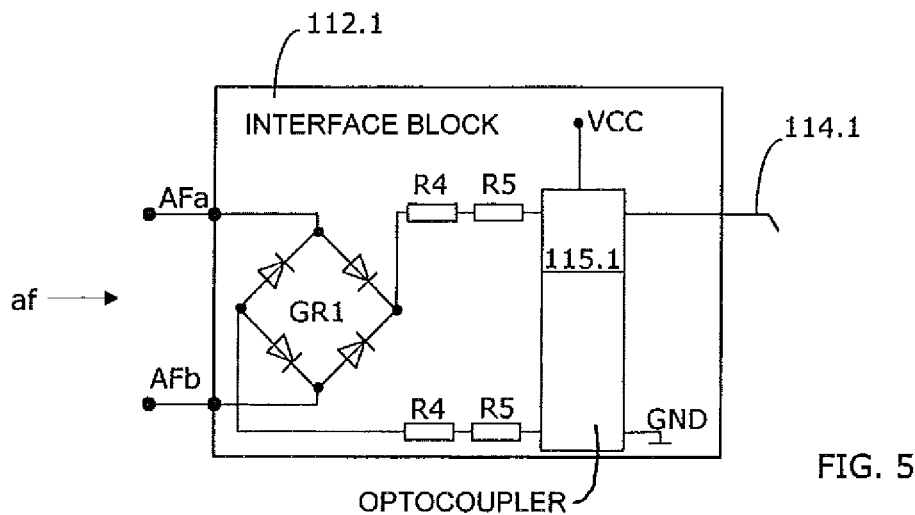
FIG. 5 details of a further interface block according to the invention, which can be part of a brake monitor.

Shown in FIG. 5 are details of a further possible interface block 112.1 which can, for example, be employed in one of the brake monitors 100 according to the invention. Shown is a block diagram of the salient circuit elements. Applied to the input side is an alternating-voltage signal af. In a rectifier GR1, the alternating-voltage signal af is transformed into a direct-voltage signal. Connected to the direct-voltage side is a resistor R4, or a plurality of resistors R4, R5 that are connected in series, to feed the direct-voltage signal to an optional optocoupler 115.1. On the output side, the optocoupler 115.1 provides a direct-voltage signal (preferably in the range of the 5 V supply voltage), which, via the connection 114.1, is conducted to the bus 120. The interface block 112.2 can be identically constructed.

Shown in FIG. 6 are details of a further possible relay circuit 103 which can, for example, be employed in one of the brake monitors 100 according to the invention. Shown is a block diagram of the salient circuit elements. The relay circuit 103 that is shown has two relays RE1, RE2 (preferably safety relays), whose switches are connected in series. Control signals a1 and a2, which are transferred from the bus 120 to the relay circuit 103, are amplified by the respective transistors TA and/or TB (preferably MOS-FET transistors are employed), to switch the respective relays RE1 or RE2. Optional light-emitting diodes (LED) show whether a switching signal is present at the relay. The relay RE1 actuates a switch SA, which is shown simplified, and the relay RE2 switches a switch SB, which is shown simplified. In the switch position that is shown, there is no contact between the connections Safety1 and Safety3. In this exceptional case, the safety circuit 20 is opened and the elevator system 10 is at rest. Should no switching pulses a1, a2 be present on the two relays RE1 and RE2, both switches SA and SB switch over, and the connections Safety1 and Safety3 are connected together electrically conductively. In this case, the safety circuit 20 is closed (if the other switch 21 of the safety circuit 20 is also closed) and the elevator system 10 can travel.

Particularly preferred is a relay circuit 103 whose relays RE1, RE2 send status signals back to the microprocessor 102 via the bus 120 (not shown). The microprocessor 102 can thereby monitor every switching operation, which further increases the safety.

As microprocessor 102, it is preferable to employ an 8-bit microcontroller. Particularly suitable is, for example, an ATMEGA88. The microprocessor 102 can be connected and/or programmed in such manner that it can process all processes and operations according to rules that are defined in advance.

By means of the microprocessor 102, the brake monitor 100 can relate the status of one or both brake contacts (K1 or K2) to the travel information (af and/or af1).

A brake monitor 100 can be employed when an existing drive 11, a newly installed drive 11, an existing elevator control 12, or a newly installed elevator control 12, cannot monitor the (holding) brake(s) 13. Then, if a brake problem is detected, the brake monitor 100 stops the elevator system. Erroneous problem detections (false detections), which can arise, for example, through the bouncing of brake contacts, should thereby be avoided as far as possible, to avoid unnecessary shutting down.

The brake motor 100 can check whether a brake of the brake system 13 opens. By contrast, the brake monitor 100 cannot detect whether the brake closes. According to a preferred embodiment, the brake monitor 100 can, however, deduce from a fault analysis whether a contact fault (electrical and/or mechanical) has occurred. However, the brake monitor 100 cannot determine whether this contact fault originates from a brake that does not close (in the sense of braking).

As described, the brake monitor 100 analyzes at least one brake contact K1, in that the corresponding brake signal kb is processed. Particularly preferred is an embodiment in which the two brake contacts K1 and K2 are analyzed, in that the corresponding brake signals kb and kb1 are processed. Preferably, the brake monitor 100 is adaptable to brake contacts K1, K2, which are normally open or normally closed. In other words, a preferred brake monitor 100 can be adapted to the polarity of the brake contacts K1, K2, and/or the polarity of the travel signal af or the travel signals af, af1.

At least one travel signal af is received and analyzed that indicates whether the drive 11 is moving. Here, together with the first travel signal af, preferably a second travel signal af1 is received and analyzed, as shown in the following Table 1:

TABLE 1

| af | af1 | AF_info |
|---|---|---|
| 1 | 0 | 1 |
| 0 | 1 | 1 |
| 0 | 0 | 0 |
| 1▲ | 1▼ | 1* |

The information signal AF_info represents the OR relation between the travel signals af and af1. If one of the travel signals af or af1 displays a logical 1, the elevator car 14 is in motion and the information signal AF_info is 1. If neither of the travel signals af or af1 is 1, the information signal AF_info is also 0. If the travel signals af and af1 are so-called travel-direction signals and, for example, af indicates the upward travel and af1 the downward travel (bottom line in the above table), a special situation can occur. If both travel signals af and af1 are logical 1, a fault has occurred, since the elevator car can obviously not travel in both directions simultaneously. This fault is shown in the table with 1*.

The travel signals or travel-direction signals af and af1 can be direct-voltage signals or alternating-voltage signals, which can preferably lie between 24 V direct voltage and 230 V alternating voltage. The brake monitor 110 is preferably correspondingly designed.

If the analysis/comparison of the signals kb and af, or kb, kb1 and af and af1, indicates that a problem has occurred, the elevator system 10 is stopped. Preferably, the design is so selected that the elevator system 10 completes a travel before it is blocked.

To prevent a false release, preferably fault memories or fault counters are employed as part of the brake monitor 100. The employment of fault memories and/or fault counters has the effect that not every fault that is detected immediately causes a stoppage of the elevator system 10. Under certain circumstances, it is accepted that a distance is traveled with applied (holding) brake. Such a travel with applied (holding) brake is unproblematical, since the wear is not very great.

The following Table 2 shows the various signals, and an interpretation of the fault memories and/or fault counters of a preferred embodiment.

TABLE 2

| kb | kb1 | AF_info (af or af1) | Remarks | Fault | Action |
|---|---|---|---|---|---|
| 0 | 0 | 0 | Start condition | 0 | Close brake contacts K1 and K2 |
| 0 | 0 | 1 | Temporary state at start/stop; contact problem or brake does not open | B = 1 | Action 1: |
| 0 | 1 | 1 | Temporary state at start/stop; contact problem or brake arm does not open | | |
| 1 | 0 | 1 | | | |
| 0 | 1 | 0 | Invalid state; contact problem or a brake arm does not leave the open position | A = 1 | Action 2: |
| 1 | 0 | 0 | | | |
| 1 | 1 | 0 | Invalid state | | |
| 1 | 1 | 1 | Normal state of traveling elevator | 0 | No action |

Action 1: Should Fault B be true for longer than tA=3 s (i.e. if B=1), a counter C1 counts three faults for three consecutive travels and a further counter C3 is employed to count at least five faults within five minutes (=300 s). If Fault B is true for less than tA=3 s, this is a typical situation where the brakes were deliberately released only after a short delay after the elevator car 14 had started to travel (temporary state at start/stop).

In addition, if Fault B is true for longer than tA=3 s, a 60 s duration limiter T1 is started. The relays RE1/RE2 open 2 s after of changes from 1 to 0, if Counter C1>2, or if Counter C3>4 after 5 minutes. The relays RE1/RE2 open immediately if the duration limiter T1 is not reset within 60 s (i.e. via a reset switch). Through the duration limiter T1, a maximum duration in case of a fault is defined. On exceeding of this maximum duration, the elevator system is shut down.

Action 2: If A is true for more than 2 s (i.e. if A=1), a counter C2 is employed to count three faults for three successive travels. The relays RE1/RE2 open immediately if the counter C2>2.

As duration limiter, preferably a timer or clock-generator is employed.

Advantageously, the corresponding processes are controlled by means of the microprocessor 102. A corresponding set of commands/rules defines the individual steps, and the parameters (as, for example, the number of permitted faults, the length of the time-window to (e.g. 3 s), the maximum time (e.g. 60 s) that the duration limiter T1 employs, etc.) are specified. The microprocessor 102 can thus process the set of commands/rules and, depending on the situation, respond in the desired form.

For example, in Action 1, the microprocessor 102 checks whether Fault B is true for more than tA=3 s. If this is the case, a counter C1, which is realized in microprocessor 102, counts three faults for three consecutive travels. The microprocessor 102 employs a further counter C3, together with a duration limiter T3, to count at least five faults within five minutes. The other rules can be processed similarly.

In an alternative embodiment, separate fault memories and/or fault counters are assigned (as hardware) to the microprocessor 102, to perform the requisite tasks.

Figure 7:
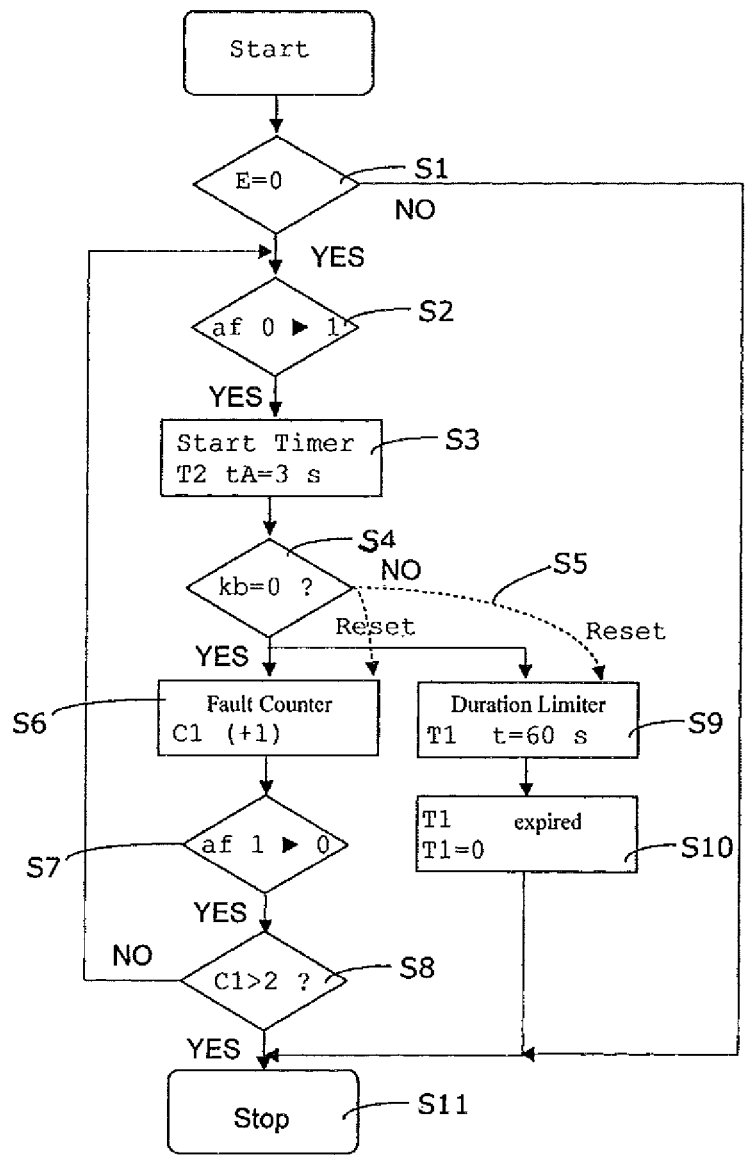
FIG. 7 a flow-chart, which shows details of a method according to the invention.

The method according to the invention for monitoring a brake system 13 is characterized by the following steps, which are shown diagrammatically in a flow-chart in FIG. 7. When monitoring the brake system 13, a first brake-release signal kb of the brake system 13, and a first travel signal af of the drive control 12, are received (steps S2 and S4). A check is then made as to whether, after the occurrence of the first travel signal af (i.e. the travel signal af changes from 0 to 1; Step S2), a first brake-release signal kb follows (Step S4). Such a brake-release signal kb occurs when a brake of the brake system 13 is released. Should this brake-release signal kb now not occur within a time-window tA (Step S3), the relay circuit 103 is activated (Step S11) to interrupt the safety circuit 20 of the elevator system 10 or a control voltage of the drive control 12. By this means, the elevator system 10 is shut down.

The flow-chart shown in FIG. 7 represents a simple implementation of the invention. After the brake monitor 100 has been started or switched on, an inquiry is made as to whether a persistent-fault memory E has stored a fault (Step S1). If E=0, no persistent fault is present. Otherwise, the elevator system can be stopped (Step S11). If no persistent fault is present, a check is made as to whether the travel signal af changes from 0 to 1 (Step S2). If so, Timer T2 is started (Step S3), which specifies a time-window of, for example, tA=3 s. If, within these 3 s, no brake-release signal kb follows (Step S4), e.g. when kb=0 persists, a first fault is present, which is stored in the fault counter C1. This fault counter C1 starts at zero and is increased in steps of +1 (Step S6). If, now, the travel signal af changes from 1 to 0 (i.e. if the elevator car stops; Step S7), a check is made as to whether more than two faults have been saved in the fault counter C1 (Step S8). If more than two faults have occurred, the elevator system 10 is shut down (Step S11). If, however, not more than two faults have occurred, the method branches back to a point before Step S2.

Parallel to counting the faults by means of the fault counter C1, a duration limiter T1 is employed (Step S9), which counts the time from zero to, for example, 60 s. If the duration limiter T1 has expired, i.e. if 60 s have been exceeded (Step S10) and the brake is still not released, which can be detected from the brake-release signal kb=0, the elevator system 10 is shut down (Step S11).

If the brake-release signal kb=1, this signifies that the brake has been released. In this case, the fault counter C1 and the duration limiter T1 are reset to zero, which is indicated by the dotted arrows referenced with S5 and the remark "Reset".

When the elevator system is shut down, for example, a persistent fault can be saved in the persistent-fault memory E, so as to prevent the elevator system from being made to run again by simply switching on and off. If E=1, i.e. if a persistent fault is present, the method immediately branches from Step S1 to the end (Step S11) as shown in FIG. 7.

Figure 8:
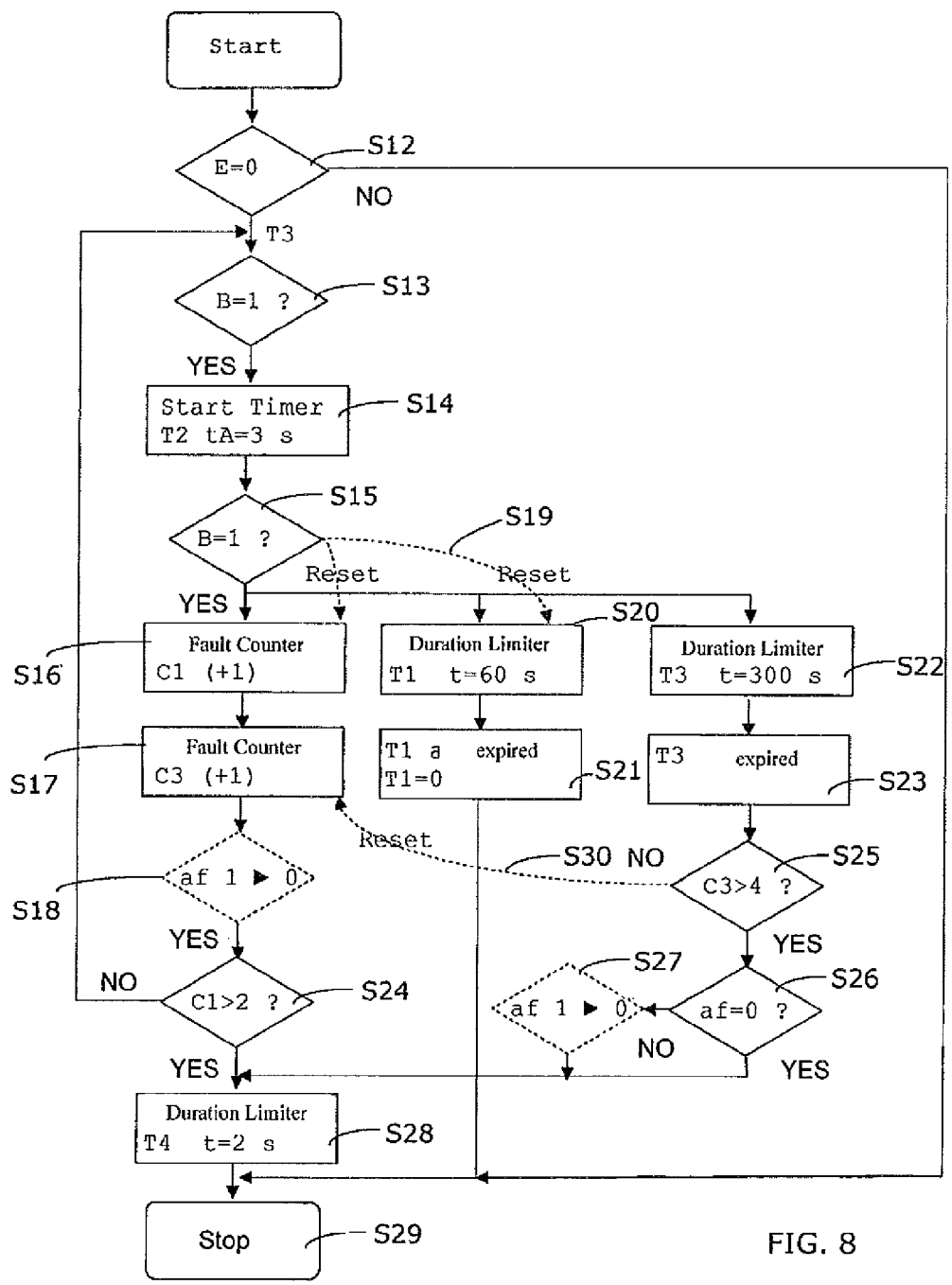
FIG. 8 a flow-chart, which shows details of a further method according to the invention.

The flow-chart diagram shown in FIG. 8 represents a preferred implementation of the invention. After the brake monitor 100 has been started or switched on, an inquiry is made as to whether a persistent-fault memory E has stored a fault (Step S12). If E=0, no persistent fault is present. Otherwise, the elevator system can be stopped (Step S29). If no persistent fault is present, a check is made as to whether B=1 (Step S13). Signal B is taken from Table 2. If so, Timer T2 is started (Step S14), which specifies a time-window of, for example, tA=3 s. If, within these 3 s, Signal B=1 persists (Step S15), a first fault is present, which is registered in the fault counter C1. This fault counter C1 starts at zero and is increased in steps of +1 (Step S16). If the travel signal af now changes from 1 to 0 (i.e. if the elevator car stops; Step S18), a check is made as to whether more than two faults have been saved in the fault counter C1 (Step S24). If more than two faults have occurred, the elevator system 10 is shut down (Step S29). If, however, not more than two faults have occurred, the method branches back to a point before Step S13. Instead of checking the travel signal af as in Step S18, here, for example, alternatively also the information signal AF_info can be checked.

Parallel to counting the faults by means of the fault counter C1, similar to in FIG. 7, a duration limiter T1 is employed, which counts the time from zero to, for example, 60 s (Step S20). If the duration limiter T1 has expired, i.e. if 60 s have been exceeded (Step S21), and the brake has still not been released, which can be detected from the brake-release signal kb=0 (or from the fault signal B=1), the elevator system 10 is shut down (Step S29).

If the brake-release signal kb=1, this signifies that the brake has released. In this case, the fault counter C1 and the duration limiter T1 are reset to zero, which is indicated by the dotted arrows referenced with S19 and the remark "Reset".

Parallel to counting the faults by means of the fault counter C1, a further duration limiter T3 can be employed (Step S22), which counts the time from zero to, for example, 300 s (=5 minutes). Also here, a fault counter C3 is employed (Step S17), which starts at zero and is increased in steps of +1. If now, after 300 s (Step S23), more than four faults are present in the fault counter C3 (Step S25), a check is made as to whether the travel signal af=0 (Step S26). In this case, the elevator system 10 is shut down (Step S29), a further duration limiter T4 with t=2 s being deployed before shutdown (Step S28). The 2 s are the waiting time that is required for the doors to open before the elevator system 10 is then shut down. If the travel signal af=1, the change of the travel signal af from 1 to 0 is awaited (Step S27), before the duration limiter T4 is then deployed. If, in Step S25, C3 is not greater than 4, the fault counter C3 is reset to zero (Step S30).

In addition, the fault signal A (see Table 2) can optionally be analyzed and processed. With a further duration limiter T5 (not shown), if A=1 a short waiting time of, for example, 2 s can be introduced. If, after the 2 s, A is still 1, a further fault counter C2 can be increased by 1. If the content of this counter C2 is greater than 2, the elevator system 10 can be shut down (Step S29).

The brake system 13 can have two brake arms, which open (i.e. a brake shoe of the brake releases) and close independent of each other. In the case of brake systems 13 with independent brake arms, one brake magnet, one spring, and one monitoring switch are present per brake arm. Other brake systems 13, however, have two brake arms that are dependent on each other. In this case, one brake magnet, one spring, and one monitoring switch are employed.

Preferably assigned to each brake arm is a brake contact K1 or K2. Preferably, a first electrical contact K1 of the brake system 13 is electrically connected to the first brake-contact switch of the brake system 13, and a second electrical brake contact K2 of the brake system 13 is electrically connected to the second brake-contact switch of the brake system 13. Each of the brake-contact switches issues a brake-release signal (kb or kb1) when the first or second brake arm respectively of the brake system 13 opens or releases.

As stated earlier, the invention relates inter alia to the retrofitting or modernization of an existing elevator system 10, which has a drive 11, a drive control 12 that is assigned to the drive 11, and a brake system 13. Retrofitting or modernization typically takes place as follows. In a method step, a separate brake monitor 100, in the form of one or more of the embodiments described hitherto, is built into the existing elevator system 10. After, or while, being built in, the first brake-signal input KB of the brake monitor 100 is connected to a first electric brake contact K1 of the brake system 13. Similarly, the travel-signal input AF of the brake monitor 100 is connected via a conductor 12.1 to a first electric travel-signal contact of the drive control 12. In addition, the voltage source 101 is so connected as to provide the brake monitor 100 with at least an operating voltage VCC. The relay circuit 103 of the brake monitor 100 is integrated in a safety circuit 20 of the elevator system, or connected to a control voltage of the drive control 12.

Preferably, the brake monitor 100 has a reset switch which, after the separate brake monitor 100 has been built in, or after a fault of the elevator installation 10 has been rectified, is actuated. Through actuation of the reset switch, the brake monitor 100 is set into a defined output state. Upon doing so, for example, the fault memories or counters C1, C2, C3 are reset (initialized).

During building-in, the brake monitor 100 can also be configured, in that settings (e.g. definitions of parameters, settings of switches, settings of bridges or DIP switches, etc.) are made. The brake monitor 100 can also be so designed that it can process an impulse signal (for example the impulse signal of an impulse tachometer for monitoring the rotational speed of the motor). In this case, the brake monitor 100 can be, for example, equipped with a corresponding input-side adaptation circuit.

The brake monitor 100 can be used with rope drives 11 as well as with belt drives 11.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for monitoring a brake system of an elevator system having a drive and a drive control comprising the steps of:
   checking for a first brake-release signal of the brake system;
   checking for a first travel signal of the elevator system;
   monitoring whether, after occurrence of the first travel signal, the first brake-release signal occurs when a brake of the brake system has been released; and
   if the first brake-release signal is not received within a time-window after the occurrence of the first travel signal, activating a relay circuit to interrupt a safety circuit of the elevator system, or to interrupt a control voltage of the drive control, to bring the elevator system to a standstill.

2. The method according to claim 1 including checking for a second brake-release signal of the brake system.

3. The method according to claim 2 wherein during the step of monitoring, checking whether at least one of the first brake-release signal and the second brake-release signal has been received, and activating the relay circuit if no brake-release signal is received within the time-window.

4. The method according to claim 1 including predefining the time-window before the step of monitoring.

5. The method according to claim 1 wherein the travel signal is either a travel-direction signal that is issued by the drive control, or the travel signal is a brake-release command that is issued by the drive control.

6. The method according to claim 1 wherein a first electric brake contact of the brake system is electrically connected to a first brake-contact switch of the brake system, and a second electric brake contact of the brake system is electrically connected to a second brake-contact switch of the brake system, and the first and second brake-contact switches issue the first brake-release signal and a second brake-release signal respectively when a first and second brake arm respectively of the brake system opens or releases.

7. The method according to claim 1 wherein the first travel signal is OR-related to a second travel signal so as to issue an information signal as soon as at least one of the first and second travel signals indicates logical 1.

8. The method according to claim 1 including providing a fault memory or fault counter to determine whether a fault occurs multiple times, and activating the relay circuit only if the fault occurs multiple times.

9. The method according to claim 1 including starting a duration limiter counting to a maximum duration time from receiving the first travel signal and, if the first brake-release signal has not been received within the maximum duration time, activating the relay circuit.

10. A brake monitor for monitoring a brake system of an elevator system having a drive and a drive control, comprising:
    a first brake-signal input for electrically connecting the brake monitor to a first brake contact of the brake system;
    a first travel-signal input for connecting the brake monitor to a first travel-signal conductor of the elevator system;
    a voltage source providing the brake monitor with at least one operating voltage;
    a microprocessor;
    a relay circuit connected for activation by the microprocessor to interrupt a safety circuit of the elevator system, or to interrupt a control voltage of the drive control, and thereby shut down the elevator system; and
    a timer connected with the first travel-signal input and the first brake-signal input for starting a time-window after occurrence of a travel signal at the first travel-signal input, and if within the time-window, no brake-release signal occurs, the microprocessor and thereby the relay circuit are activated.

11. The brake monitor according to claim 10 including a second brake-signal input for connecting the brake monitor to a second brake contact of the brake system.

12. The brake monitor according to claim 10 wherein under control by the microprocessor, the brake monitor checks whether, after occurrence of the travel signal at the first travel-signal input, at least one brake-release signal occurs when the brake system, or a brake of the brake system, has been released.

13. The brake monitor according to claim 12 wherein the brake monitor expects the at least one brake-release signal within a predefined time-window after arrival of the travel signal, and wherein activation of the relay circuit occurs when either no brake-release signal occurs, or when no brake-release signal occurs within the time-window.

14. The brake monitor according to claim 10 wherein the first travel-signal input is connected to the first travel-signal conductor, and a second travel-signal input of the brake monitor is connected to a second travel-signal conductor of the drive control, and wherein the brake monitor OR-relates a first travel signal on the first travel-signal conductor to a second travel signal on the second travel-signal conductor for issuing an information signal as soon as at least one of the first and second travel-signal conductors displays logical 1 as the first and second travel signals respectively.

15. The brake monitor according to claim 14 wherein the first travel signal is a first travel-direction signal, and the second travel signal input is a second travel-direction signal, and wherein the brake monitor issues a fault signal if the first and second travel-direction signals indicate different travel directions.

16. A method for retrofitting or modernizing an existing elevator system having a brake system, a drive and a drive control comprising the steps of:
   adding into the existing elevator system a separate brake monitor;
   connecting a first brake-signal input of the brake monitor to an electric brake contact of the brake system;
   connecting a travel-signal input of the brake monitor to an electric travel-signal conductor of the drive control;
   connecting a voltage source of the brake monitor to provide the brake monitor with at least one operating voltage; and
   connecting a relay circuit of the brake monitor to a safety circuit of the elevator system or to a control voltage source of the drive control;
   monitoring whether, after occurrence of a travel signal at the travel-signal input, a brake-release signal occurs at the brake-signal input when a brake of the brake system has been released; and
   if the brake-release signal is not received within a time-window after the occurrence of the travel signal, activating the relay circuit to interrupt the safety circuit, or to interrupt the control voltage, to bring the elevator system to a standstill.

* * * * *